(12) United States Patent
Peszek et al.

(10) Patent No.: US 8,909,940 B2
(45) Date of Patent: Dec. 9, 2014

(54) EXTENSIBLE PRE-BOOT AUTHENTICATION

(75) Inventors: Jacek Peszek, Gdynia (PL); Ned M. Smith, Beaverton, OR (US); Vincent J. Zimmer, Federal Way, WA (US); Victoria C. Moore, Phoenix, AZ (US); Alberto J. Martinez, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 12/974,244

(22) Filed: Dec. 21, 2010

(65) Prior Publication Data

US 2011/0138166 A1   Jun. 9, 2011

Related U.S. Application Data

(63) Continuation-in-part of application No. 12/214,830, filed on Jun. 23, 2008, now Pat. No. 8,201,239.

(51) Int. Cl.
*G06F 12/14* (2006.01)
*G06F 21/57* (2013.01)

(52) U.S. Cl.
CPC ................. *G06F 21/575* (2013.01)
USPC ............ 713/193; 713/2; 713/155; 713/182; 713/186; 713/189; 380/277

(58) Field of Classification Search
CPC ... G06F 21/575; G06F 21/57; G06F 21/6218; G06F 9/4401
USPC ............ 703/2, 155, 186; 380/277; 707/100; 713/2, 155, 165, 182, 186, 189, 193; 709/231
See application file for complete search history.

(56) References Cited

U.S. PATENT DOCUMENTS

| 7,103,529 | B2 * | 9/2006 | Zimmer | 703/27 |
|---|---|---|---|---|
| 7,320,052 | B2 * | 1/2008 | Zimmer et al. | 711/114 |
| 8,130,960 | B2 * | 3/2012 | Zimmer et al. | 380/277 |
| 8,332,653 | B2 * | 12/2012 | Buer | 713/189 |
| 8,510,570 | B2 * | 8/2013 | Smith et al. | 713/190 |
| 8,588,422 | B2 * | 11/2013 | Beachem et al. | 380/277 |
| 8,667,273 | B1 * | 3/2014 | Billstrom et al. | 713/165 |
| 2004/0064457 | A1 * | 4/2004 | Zimmer et al. | 707/100 |
| 2004/0158711 | A1 * | 8/2004 | Zimmer | 713/165 |
| 2005/0071677 | A1 * | 3/2005 | Khanna et al. | 713/201 |
| 2006/0090084 | A1 * | 4/2006 | Buer | 713/189 |

(Continued)

OTHER PUBLICATIONS

U.S. Appl. No. 11/897,355, filed Aug. 30, 2007, entitled "Method for Firmware Isolation," by Jiewen Yao, et al.

(Continued)

*Primary Examiner* — Thu Ha Nguyen
(74) *Attorney, Agent, or Firm* — Trop, Pruner & Hu, P.C.

(57) ABSTRACT

In one embodiment, the present invention includes a method for obtaining a pre-boot authentication (PBA) image from a non-volatile storage that is configured with full disk encryption (FDE), and storing the PBA image in a memory. Then a callback protocol can be performed between a loader executing on an engine of a chipset and an integrity checker of a third party that provided the PBA image to confirm integrity of the PBA image, the PBA image is executed if the integrity is confirmed, and otherwise it is deleted. Other embodiments are described and claimed.

19 Claims, 10 Drawing Sheets

(56) References Cited

U.S. PATENT DOCUMENTS

| | | | |
|---|---|---|---|
| 2008/0120499 A1* | 5/2008 | Zimmer et al. | 713/2 |
| 2008/0222423 A1* | 9/2008 | Rodriguez et al. | 713/182 |
| 2009/0070593 A1* | 3/2009 | Boshra et al. | 713/186 |
| 2009/0319806 A1 | 12/2009 | Smith et al. | |
| 2010/0011350 A1* | 1/2010 | Zayas | 717/171 |
| 2010/0303240 A1* | 12/2010 | Beachem et al. | 380/277 |
| 2010/0306399 A1* | 12/2010 | Khosravi et al. | 709/231 |
| 2011/0138166 A1* | 6/2011 | Peszek et al. | 713/2 |
| 2012/0017271 A1* | 1/2012 | Smith et al. | 726/19 |
| 2012/0131322 A1* | 5/2012 | Smith et al. | 713/2 |
| 2012/0163602 A1* | 6/2012 | Zimmer et al. | 380/277 |
| 2012/0179904 A1* | 7/2012 | Dunn et al. | 713/155 |
| 2013/0275747 A1* | 10/2013 | Brumback et al. | 713/155 |
| 2014/0025941 A1* | 1/2014 | Bulusu et al. | 713/2 |

OTHER PUBLICATIONS

U.S. Appl. No. 12/156,223, filed May 30, 2008, entitled "Enabling Byte-Code Based Image Isolation," by Jiewen Yao, et al.

* cited by examiner

EXTENSIBLE PRE-BOOT AUTHENTICATION

This application is a continuation-in-part of U.S. patent application Ser. No. 12/214,830, filed Jun. 23, 2008 now U.S. Pat. No. 8,201,239, entitled "Extensible Pre-Boot Authentication," the content of which is hereby incorporated by reference.

BACKGROUND

To improve security of computer systems, various efforts have been made in both hardware and software to lock down a system and ensure that unauthorized access is not permitted. One such effort is full disk encryption (FDE), in which virtually all data stored on a disk is encrypted.

In a pre-boot environment, Unified Extensible Firmware Interface (UEFI) code in accordance with the UEFI Specification Version 2.0 (dated Feb. 21, 2006) or later revision, which calls for the separation of pre-boot and boot environments into a variety of phases, may execute before handoff to an OS. Many FDE schemes require some pre-operating system (OS) user authentication. But this user-authentication cannot wholly occur in the OS since the OS image is itself encrypted. As such, a rich plurality of authentication tokens/credentials and credential providers need to be hosted in this pre-OS regime. In some systems, a different OS, e.g., Linux™, is launched in the pre-OS space to perform the user authentication. However, this pre-OS launch of a different OS is typically outside of the UEFI specification. Further, this pre-OS launch then needs to return to the platform basic input/output system (BIOS) (UEFI or legacy) and continue to the main OS boot. This is a huge impediment to boot time, is a large storage overhead, and effectively entails duplication of many platform BIOS capabilities.

DETAILED DESCRIPTION

Embodiments may enable a platform to provide an extensible pre-boot authenticator (PBA) that can interact with security enhancements, such as a full disk encryption (FDE) scheme. Embodiments allow for conjoining chipset-hooks and capabilities with UEFI pre-OS and runtime flows to have a high-assurance implementation of FDE.

In one embodiment, security firmware, which may be present within a chipset or other system component, can perform isolated, access-controlled storage for provisioning UEFI PBA executables in-band and out-of-band via a manageability engine (ME), and a remote web-services networking capability. A virtualization engine (VE) in the chipset provides for a trusted path via console input virtualization and output via a trusted sprite.

Various devices and other ingredients may contribute to enable different embodiments. First a user identity manager or other UEFI driver may be used to manage the process of determining the user's identity and storing information about the user. A user enrollment manager is an application that adds or enrolls new users, gathering the necessary information to ascertain their identity in the future. A credential provider driver manages a single class of credentials. Examples include a Universal Serial Bus (USB) fingerprint sensor, a smart card or a password.

The implementation of these drivers can have defaults which use platform resources, such as flash memory, to store pre-shared keys (PSK's), such as hashes of passwords, and can include standard USB tokens that adhere to profiles, such as USB mapping for smart cards. The same holds true for consoles. A simple input protocol can be implemented on top of a standard USB interface, a keyboard, or other device, and the text output can be sent to a video graphics adaptor (VGA) or to another console, such as an integrated graphics frame buffer. In other implementations, the same application programming interfaces (APIs) can be published on top of accessors to a virtualization engine controller interface (VECI) in order to have access to integrated credential providers and a trusted path for the input and output console.

Figure 1:
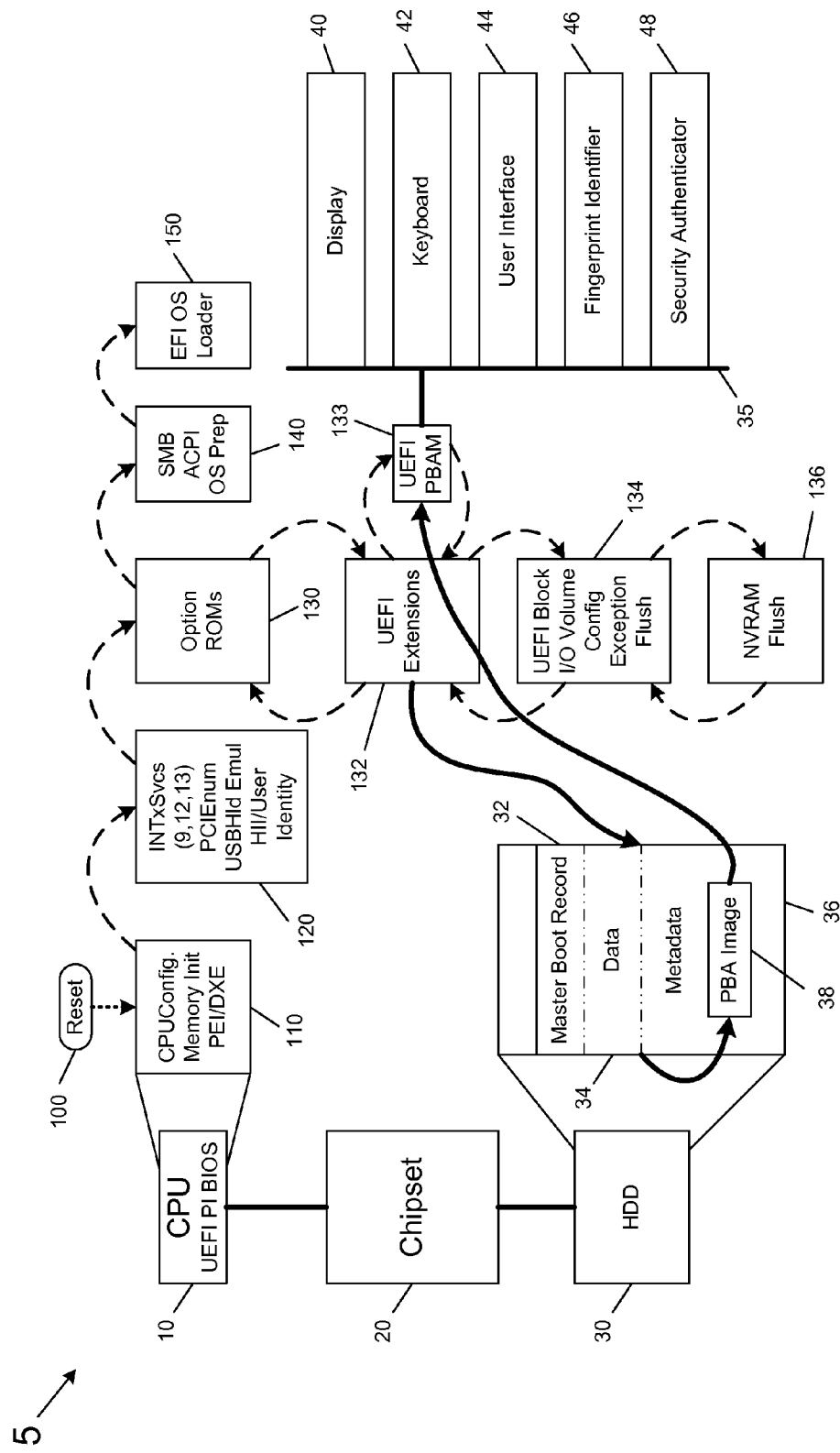
FIG. 1 is a boot flow diagram for booting in a system in accordance with one embodiment of the present invention.

Referring now to FIG. 1, shown is a boot flow diagram for booting a system in accordance with one embodiment of the present invention. As shown in FIG. 1, a system 5 includes various hardware resources, including a processor 10 such as a central processing unit (CPU). A chipset may be coupled to processor 10. Specifically, chipset 20 may be one or more integrated circuits to interface with system memory, peripherals and so forth. One such component to which chipset 20 is coupled is a non-volatile storage 30, which may be a hard drive in which data may be encrypted using full data encryption (FDE). That is, chipset 20 may encrypt all data resident in storage 30. As further shown in FIG. 1, a layout of storage 30 includes a master boot record 32, data 34, and a metadata storage 36 which in one embodiment may be unencrypted (i.e., not using FDE) metadata associated with various secure operations. Various data may be stored in metadata region 36, including a pre-boot authentication (PBA) image 38. A host connect interface (HCI) may through a BIOS driver, provide access to security resources such as PBA image 38 that is stored in metadata storage 36, which may be a hidden partition of storage 30. Note that this portion is not encrypted using full disk encryption, although the data may be encrypted in another manner.

FIG. 1 further shows additional hardware that may be present in a system, including a display 40, a keyboard 42, a user interface 44 such as a mouse or other device, a fingerprint identifier 46, and a security authenticator 48, all of which may be coupled to chipset 20 via a trusted path 35.

As will be discussed further below, user input such as credential information, e.g., passwords, fingerprints, other codes and so forth, may be input via these user interfaces and provided via trusted path 35 to chipset 20, e.g., during pre-boot authorization activities.

FIG. 1 further shows a flow diagram for booting of system 5 in a UEFI environment in accordance with one embodiment of the present invention. As shown in FIG. 1, at a reset event 100, a host root of trust is established and various configuration and initialization operations may be performed using various code executed by processor 10. Such code may include a pre-EFI initialization environment (PEI) in which code minimal processor, chipset and platform configuration is performed to support memory discovery. Then a driver execution environment (DXE) phase may be performed in which firmware code may operate in the pre-boot environment, and that can be implemented as multiple drivers to complete initialization of the platform and devices. For example, device, bus or service drivers may be executed responsive to dispatch by a DXE dispatcher. Control thus passes to a pre-EFI/Architecture Driver Execution Environment (PEI/DXE) phase 110, which in turn initiates various enumeration and identification processes 120. Note that in some embodiments, a DXE driver invokes a trusted execution technology (TXT) to do a trusted load and a trusted hand off of execution and that would prevent an untrusted boot kit from being able to mask a legitimate pre-boot authentication module.

After such operations one or more option read-only memories (ROMs) 130 may be enabled which may execute various EFI drivers and extensions, including a UEFI security extension 132. As shown, this code may obtain PBA image 38 and execute a PBA module (PBAM) 133 to obtain the user input such as authorization information, credential information and so forth. The image may compare this information to stored credential information to determine whether to authorize the user. Further, the received user credential information may be stored in a given storage, such as metadata storage 36. PBAM 133 may thus act as a collector to collect authentication values via an interface to a user (e.g., fingerprint, password, or so forth), and to pass the same to, e.g., secure firmware present in the chipset, which then evaluates the data based on an expected value. Upon successful authentication, the firmware can decrypt the metadata which essentially wraps the disencryption keys to allow communication between the chipset and a given device such that normal advanced host controller interface (AHCI) processing can occur. When the PBA image is read from the disk, the security firmware will verify an integrity check value. In this way, a threat of a drive being inserted into another platform can be prevented.

Then the normal PBA code can run to authenticate the user and pass that information to security firmware. Then a secure exit can be performed to return to the regular environment to continue a bootstrap to the OS loader. Additional operations such as various UEFI block input/output (IO) operations 134 may be performed and a flush of non-volatile random access memory (NVRAM) 136 may be performed. After successful initiation of option ROMs, control passes to block 140 for further pre-OS operations such as enabling of a system management BIOS (SMB) and an Advanced Configuration and Power Interface (ACPI), and preparing for an OS load. Finally, if all such events are successful, a normal boot may occur via an EFI OS loader 150. While shown with this particular implementation in the embodiment of FIG. 1, the scope of the present invention is not limited in this regard.

Figure 2:
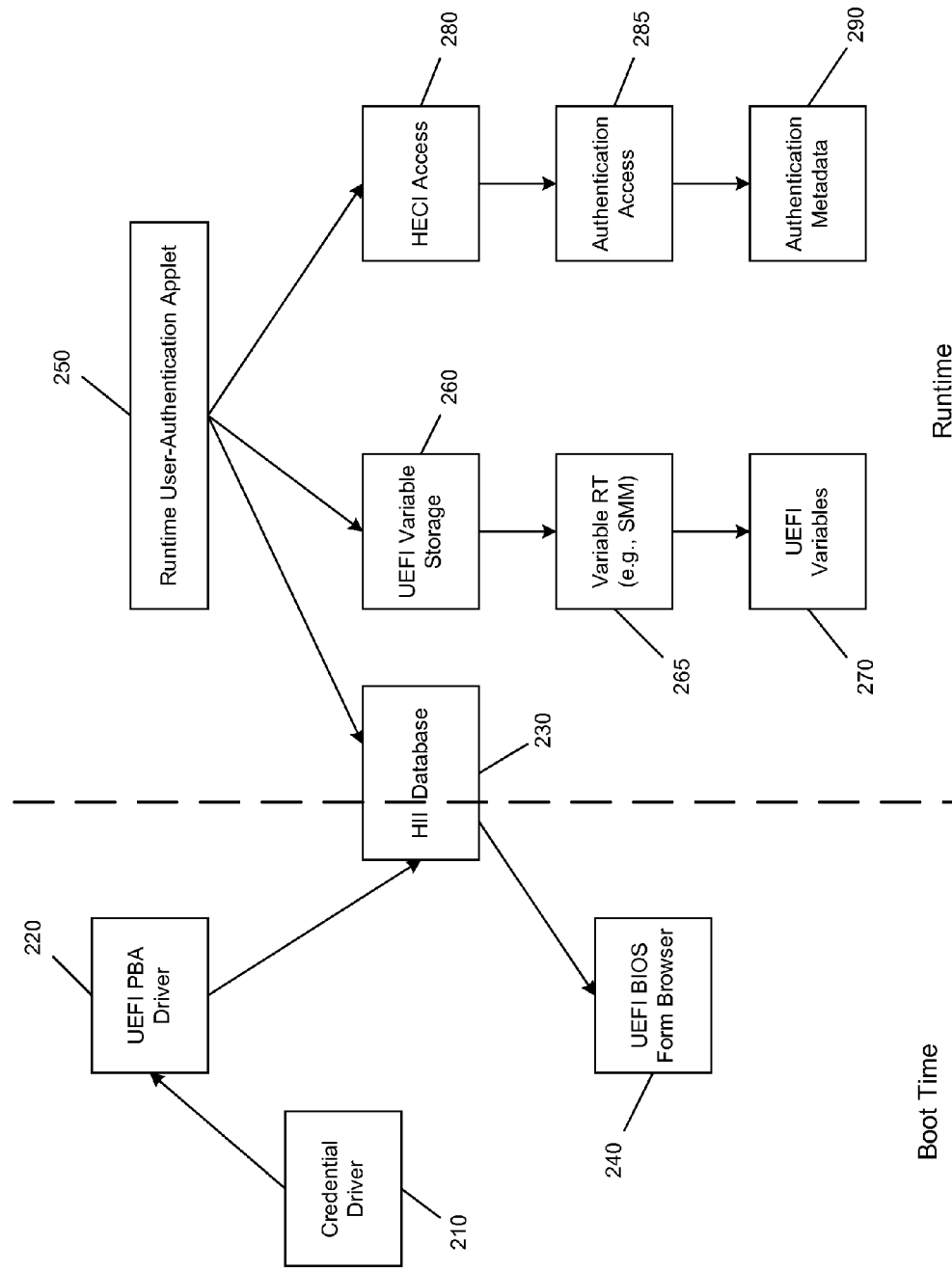
FIG. 2 is a block diagram of a model for EFI access at runtime in accordance with one embodiment of the present invention.

Referring now to FIG. 2, shown is a block diagram of a model for EFI access at runtime. As shown in FIG. 2, at block 210 credential drivers are published. These can be standard UEFI drivers that use a UEFI USB stack or drivers that use a VECI to communicate with hardware, e.g., via a virtualization engine (VE), as will be described below. These drivers will expose the same protocol so that various pre-boot authenicators (PBAs) can access these hardware capabilities. At block 220, various PBAs (e.g., UEFI PBA drivers) are executed that can expose a set of questions and manage user credentials into the platform. In UEFI, presentation management is under control of BIOS (i.e., they manage their own 'look and feel', etc) so the PBA's will post UEFI host information (HII) forms obtained from a HII database 230 with internationalization-friendly strings and questions. The platform "browser" will expose the user-authentication questions to the user, as shown at block 240. In one embodiment, console drivers published on a system use a trusted path, namely simple-input protocol and graphics output protocols, respectively, to be abstracted to the browser via drivers that have a trusted path via the VECI into a chipset. Note that the actual user-interaction with the system can be at a local console or via an actively managed-hosted remote session (e.g., a keyboard, video mouse controller). This user-authentication may thus enable high-security in FDE.

The above blocks 210-240 represent the conjunction of the UEFI-hosted PBA and a trusted path. Note that the drivers can be provisioned into the file allocation table (FAT) partition of the metadata with protected UEFI driver load list variables. This will allow for addition of successive credential providers and PBA's after an original equipment manufacturer (OEM) ships the system (i.e., under information technology (IT) authority). This hosted driver store will also allow for out-of-band (OOB) provisioning of these drivers by IT remotely, as will be described below. Driver provisioning from a hidden disk range controlled by firmware in a manageability engine (ME) as well as driver context sharing is described in more detail below.

At runtime after booting, a single-sign on (SSO) usage model can be realized. Therein, some of the pre-OS user information can be passed into the OS runtime. The UEFI standard for user identification only stipulates the pre-OS API's (i.e., "protocols" in UEFI parlance). The passing of proof information beyond pre-OS is not treated. As such, the ability to proxy this information into an OS runtime and have an OS driver that opaquely accesses either the proof information via UEFI protected variables or via access to protected metadata via a VECI is possible.

Thus as shown in FIG. 2, during runtime, a user authentication applet 250 may execute and which can access UEFI variable storage 260, runtime variables 265 such as system management mode (SMM) data, and UEFI variables 270. Still further, applet 250 may perform a HECI access 280 to retrieve and/or provide authentication access 285 to authentication metadata 290, which may be stored in the hidden disk partition, as discussed above.

Figure 3:
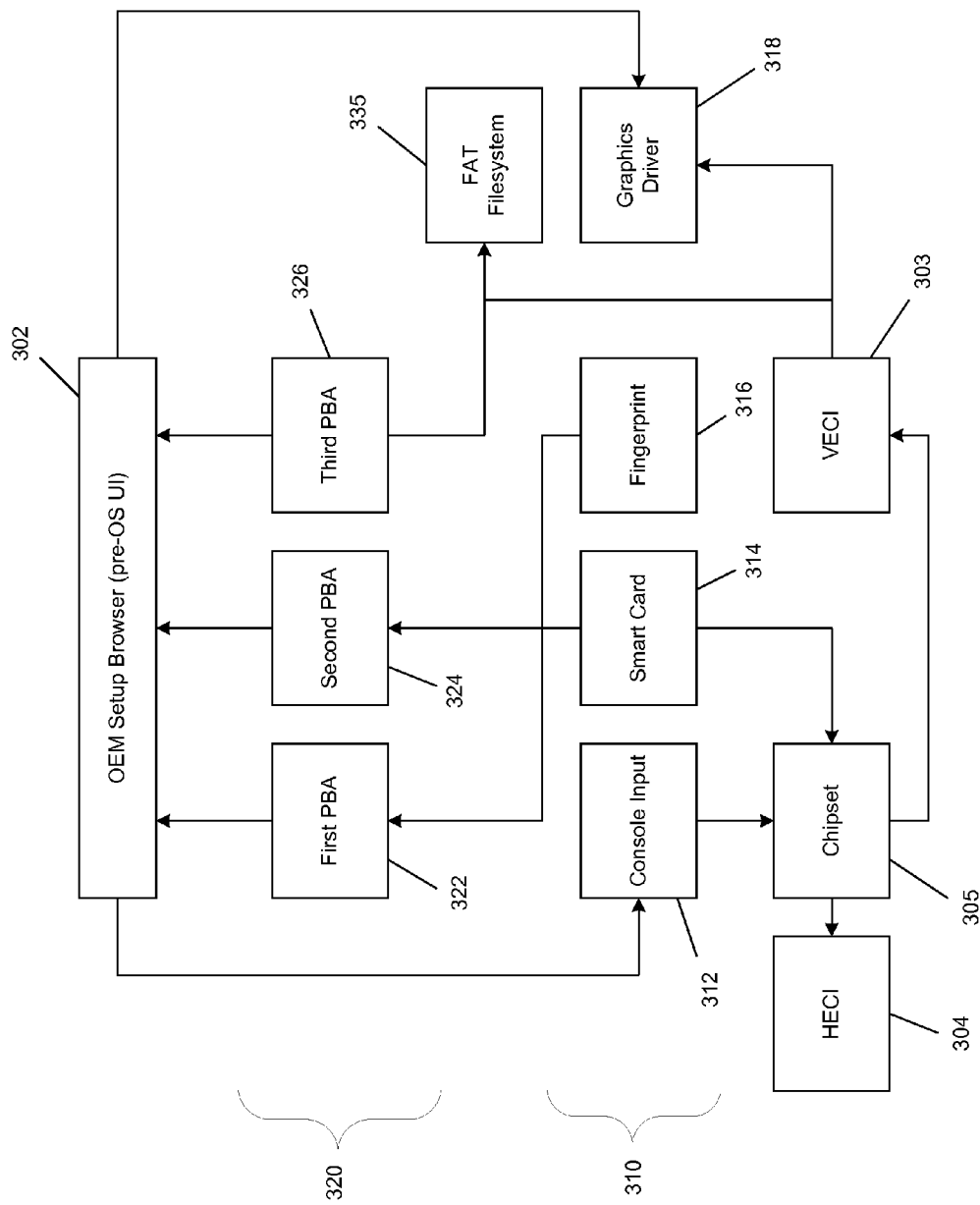
FIG. 3 is a block diagram showing linkages to firmware with EFI service and device drivers in accordance with one embodiment of the present invention.

FIG. 3 is a block diagram showing linkages to ME and VE firmware with EFI service and device drivers layered on top of hardware interfaces. Here a device layer 310 supports authentication via vendor specific devices such as fingerprint scanners, smart card readers and more traditional keyboard/graphics for password authentication. Device layer 310 interfaces to hardware such as a chipset 305 using a VE command interface (VECI) 303. A VE of chipset 305 is a data channel that can be virtualized in firmware such that physical authentication devices can be implemented with "trusted path" attributes, namely the VE can establish an authenticated data path between physical device and chipset firmware that is not spoofable by bus monitoring hardware or software. The VE may also enable/disable features of a physical device that IT personnel determines are desirable/undesirable according to their security policy. Therefore, vendor authentication devices can become more trustworthy to IT because of VE in chipsets. In EFI, access to VE-enabled devices for authentication is via EFI device drivers that do not require special instrumentation in order to work with VE, however VE aware EFI device drivers can report trusted-path security attributes to PBA modules to allow users the option of selecting more secure and trustworthy authentication devices.

As shown in the embodiment of FIG. 3, such vendor authentication devices can include console input 312, a smart card 314, a fingerprint scanner 316 and a graphics driver 318. As shown in FIG. 3, each of these devices can communicate with various other components via interfaces to a pre-OS user interface 302, which may be a given OEM setup browser, communication to a given one of PBAs 322, 324, and 326, and/or to chipset 305. For example, communication from a user to the console input 312 may be by a simple text input protocol or to graphics driver 318 via a graphics output protocol. In turn, the information to be shown to a user may be published by PBAs 322-326 via HII forms to user interface 302. Other protocols may also be used. For example, an EFI_USER_CREDENTIAL_PROTOCOL may be used to communicate fingerprint information from fingerprint scanner 316 to first PBA 322, and a USB_HC_PROTOCOL may be used to communicate information from console input 312 to chipset 305. Still further, communications between chipset 305 and HECI interface 304 may be via a given HECI protocol, while communications between chipset 305 and VECI interface 303 may be via a given HECI or VECI protocol. As further shown in FIG. 3, a file allocation table (FAT) file system 335 may be in communication with third PBA 326 to receive information from third PBA 326.

The layer above the device layer is the service driver layer 320. Service layer 320 contains PBA building blocks components that may be called by a controlling PBA module. However, flexibility exists in the architecture for a service driver to operate independently of a controlling PBA application. For example, a complete authentication challenge protocol can be performed stand-alone. Service driver layer 320 modules necessarily can call into a ME of chipset 305 via a host embedded controller interface (HECI) 304 or control channel side of chipset 305 where embedded capabilities can be leveraged. For example, user account metadata can become active only when a given service driver (or other PBA) successfully produces authentication credentials that unlocks account data. Still other ME firmware can manage enterprise user account state; having the ability to interact with enterprise identity management servers (especially over ME Common Services out-of-band (OOB) channel) such that enterprise-managed users can maintain up-to-date account metadata within the ME. An EFI PBA module therefore does not need to be updated in order to respond to remotely applied user account changes.

Service driver modules can be highly specialized modules that focus on a particular class of authentication or recovery protocol. Other service drivers or a controlling PBA module can leverage this specialized behavior by invoking specific interfaces (that may be proprietary or standard). In some embodiments, server drivers may be called from an OS-present mode (see FIG. 2) such that users may re-authenticate or authenticate with additional factors while still retaining full features contained in PBA modules. This is achieved by leveraging EFI framework. By leveraging this capability for authentication, IT can maintain a consistent authentication scheme across pre and post-boot environments.

Thus in various ME platforms with security technology, a portion of unprotected but hidden metadata can be exposed to the EFI. This metadata is not directly accessible via the VE or EFI drivers. It can only be accessed via a secure host controller interface. Embodiments thus can enforce an access control policy that is specific to pre-boot authentication requirements. For example, a third party PBA vendor can use this metadata area to store a copy of their PBA and have it be called from the pre-boot PBA environment even through the third party module was not included in the BIOS flash region by the OEM.

Figure 4:
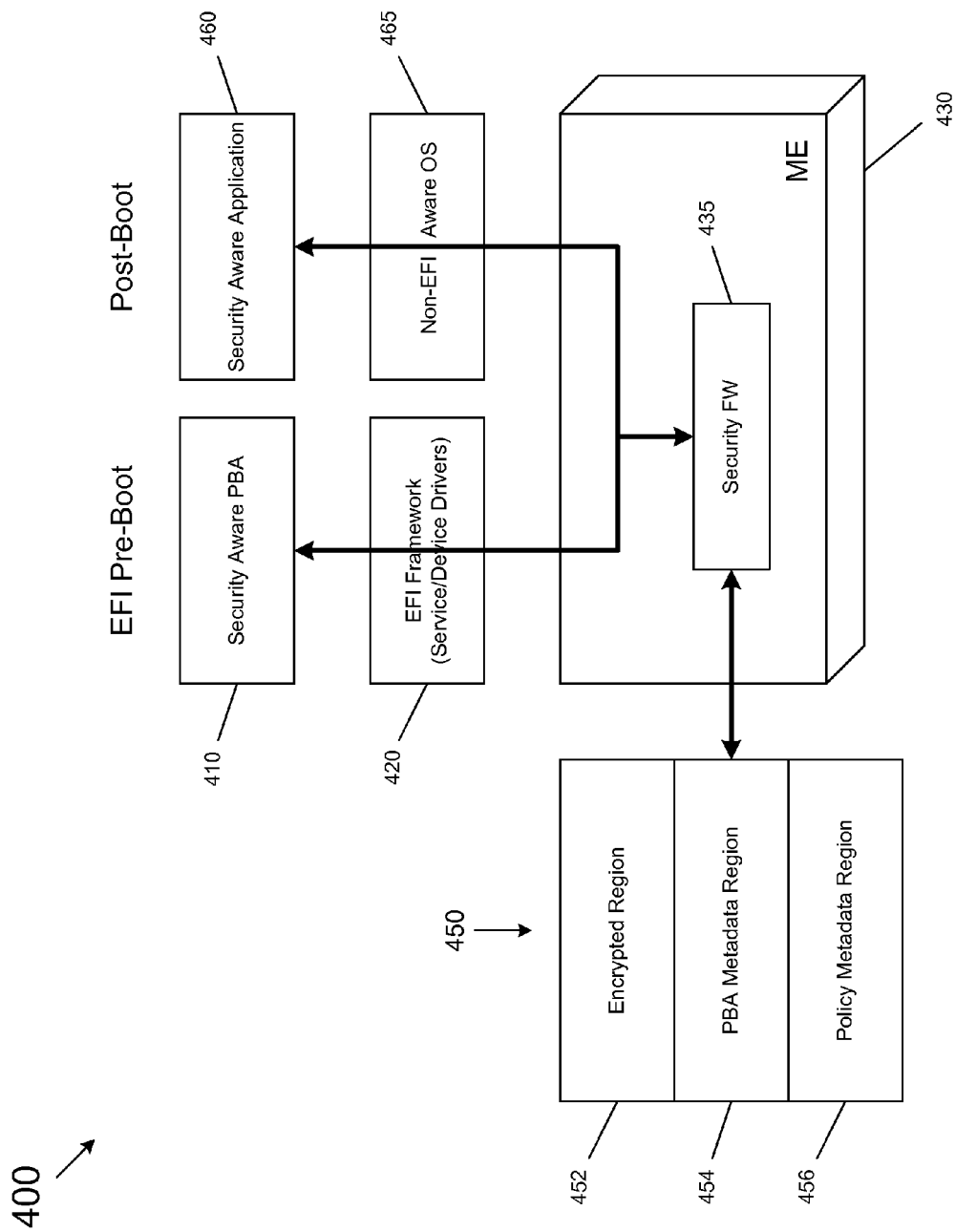
FIG. 4 is a block diagram of post-boot context management in accordance with one embodiment of the present invention.

Referring now to FIG. 4, shown is a block diagram of post-boot context management in accordance with one embodiment of the present invention. In FIG. 4, a security aware application 410 (either EFI or legacy BIOS) establishes a pre-boot authentication context. This context is communicated across the pre-post-boot boundary through an EFI framework 420 (e.g., service/device drivers such as shown in FIG. 3) which communicates with a manageability engine (ME) 430, which may be of a chipset or other component in communication with a hard disk drive (HDD) 450, which may be a FDE drive having an encrypted region 452. This context is saved into an unencrypted but hidden (to non-security aware applications) in a PBA metadata region 454 of HDD 450 that is under the control of security firmware 435.

After the platform transitions to post-boot, a non-EFI aware OS 465 is launched. EFI facilities are not available post-boot either because EFI was dismantled as part of a BIOS legacy compatibility mode operation or because the OS is not able to invoke EFI post-boot interfaces. During runtime, a security aware application 460 is able to obtain the pre-boot PBA context by issuing a call, which may be performed after a re-authorization of the user. The call may generate a read command that produces the pre-boot context previously saved by the security-aware PBA module 410. Thus the post-boot PBA may perform administrative or operational tasks based on the PBA context even though the OS is not EFI aware.

It is also possible for a post-boot agent to affect the state and operation of the PBA (i.e., next time the system boots) by reversing the direction of the steps outlined above, which may store revised or updated policy metadata in a policy metadata region 456 of hard drive 450. Hence, the PBA can read context from a previously executed post-boot agent. This may be useful when post-boot authentication is performed that results in the user credentials being modified or policy affecting how the user is authenticated impacts PBA logic. For example, a password strength policy can be provided by a remote agent to provision both a PBA image and the password policy, e.g., via an OOB channel to a chipset ME. In this way, the security firmware can apply the policies and write the policies into the storage area of the drive for a host environment to access the policies, and understand what policies were applied. Thus ME, PBA and the post-boot authentication environment all know what the policies have been provisioned, e.g., dynamically through a network. In run time, the system can authenticate the user and update authentication state using EFI variables, and so the EFI has variable storage. A HECI driver can communicate with the security firmware and provide the authentication information back to the metadata store in the disk drive. Thus via a runtime environment updated metadata can be stored into the metadata area, such that at a next pre-boot environment, that updated metadata can be discovered in the pre-boot module to ascertain that a user logged in during runtime, changed credentials or so forth.

Figure 5:
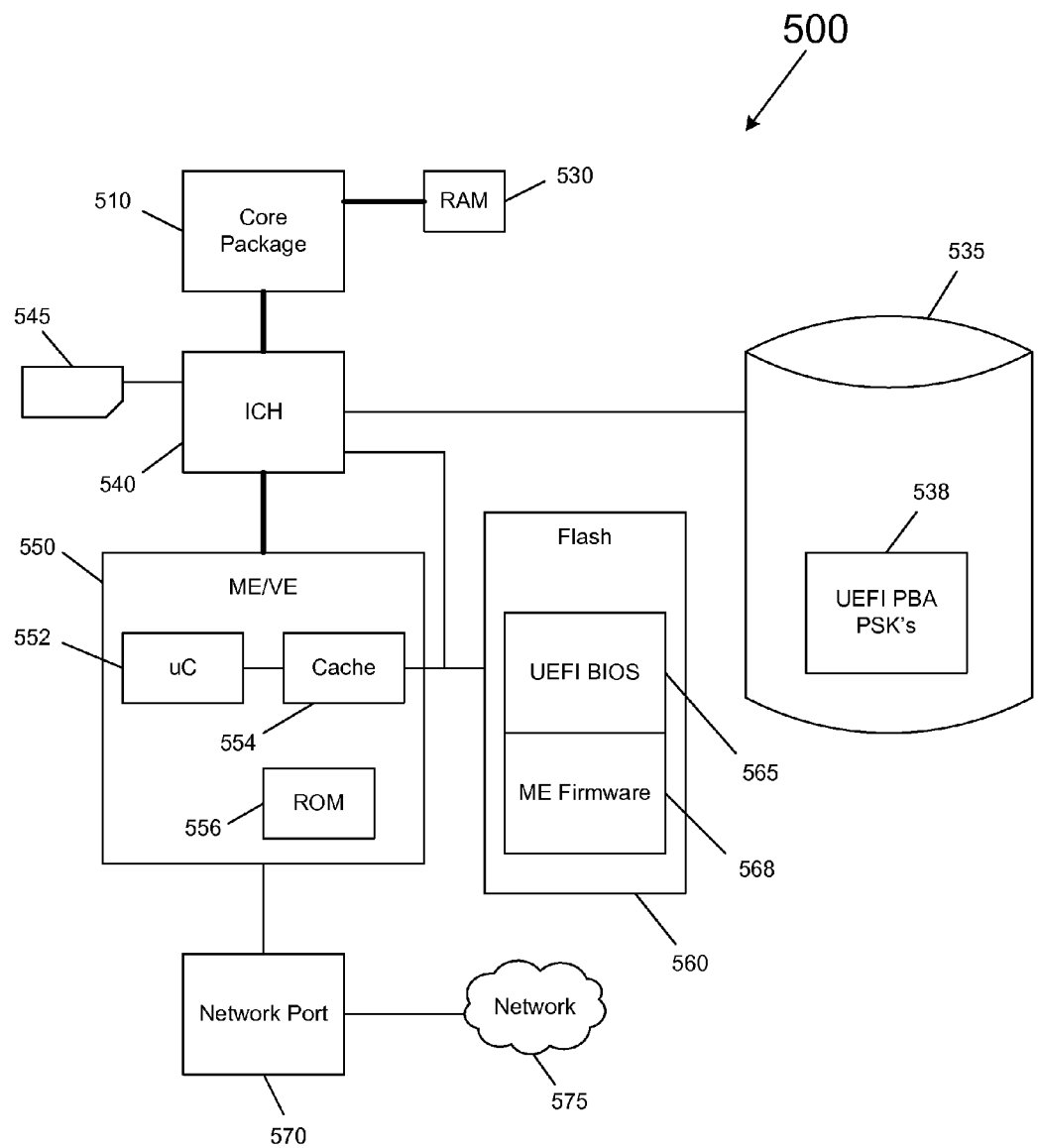
FIG. 5 is a block diagram of a system in accordance with one embodiment of the present invention.

Referring now to FIG. 5, shown is a block diagram of system 500. As shown in FIG. 5, system 500 may include a core package 510 that includes at least one core and is coupled through an integrated memory controller to a system memory 530, which in one embodiment may be a dynamic random access memory (DRAM). Core package 510 is further coupled to an input/output controller hub (ICH), which in turn may be coupled to a hard disk drive such as drive 535, which may be encrypted using FDE. As shown, certain data may be stored in a security-enabled hidden, but unencrypted portion 538. Such data as discussed above may include UEFI PBA images, PSKs and so forth. As further shown in FIG. 5, ICH 540 may be coupled to an integrated smart card 535, such as an integrated trusted platform module (iTPM).

Still further as shown in FIG. 5, ICH 540 may be coupled to a manageability engine/virtualization engine (ME/VE) 550. In one embodiment, ME/VE 550 may be a separate component, or it may be part of ICH 540. In the embodiment shown in FIG. 5, ME/VE 550 includes a microcontroller 552, a cache memory 554, and a read-only memory (ROM) 556. ME/VE 550 may be coupled to a flash memory which may store, in one embodiment UEFI BIOS 565 and ME firmware 568. In turn, ME/VE 550 may be coupled to a network port 570 which in turn couples to a network 575.

As shown in FIG. 5, a remote agent may couple to system 500 remotely through network 575. In this way, the remote agent, which may be an IT personnel or other such remote user, may provision the UEFI PBA remotely. Still further, during such provisioning ME/VE 550 may evaluate a policy against local user settings, credentials in TPM 545 or so forth, to determine whether to allow the remote provisioning, e.g., of hidden storage region 538. While shown with this particular implementation in the embodiment of FIG. 5, the scope of the present invention is not limited in this regard.

By providing the hidden metadata area, rich features of pre-boot authentication can be made available even when legacy OSs are used that do not support EFI. For example, a third party vendor of authentication solutions can provide a pre-boot EFI capability and a post-boot agent can synchronize state between pre- and post-boot by using this metadata storage area to pass synchronization variables. This allows more consistent authentication behavior on platforms even when PBA architecture is limited to EFI compatibility or legacy BIOS implementations and where post-boot environments are limited to non-EFI aware OSs. Thus the PBA image itself can be provisioned out of band, the integrity policy for the PBA can be provisioned and authentication policies such as password strength can be provisioned. Those policies can either be consumed locally by the ME, and they can be forwarded to the pre-boot or the post boot environment by storing it in a hidden metadata region of the drive.

Embodiments thus allow IT personnel to use the user/administrative capability of an implementation of UEFI (e.g., UEFI2.2) and authenticode-signed UEFI system partition on the larger, open disk or into the FAT partition of the protected, hidden metadata region.

Other embodiments may be used in connection with systems that have OSs configured for UEFI operation. In such embodiments, various third parties may be able to provision updated drivers in a secure manner, even where the third parties have differing security protocols. This is so, as embodiments may provide a common PBA identity manager protocol to allow multiple third parties to implement their desired credential operations, via a selected one of multiple credentialing mechanisms available on the platform.

In this way, embodiments can be used to enable third party-provided EFI BIOS (or other) drivers to be loaded from a hidden partition of a serial advanced attachment (SATA) device such as a hard drive. Accordingly, IT personnel and independent software vendors (ISVs) can update drivers in the hidden partition remotely or by a local management application. Prior to loading/executing such EFI drivers contained in the hidden partition, they can be integrity verified. In various embodiments, verification credentials can be controlled by the user/ISV who provisioned the stored drivers. In this way, a third party provided credential provider driver can dynamically extend PBA functionality.

As discussed above, at least a portion of a storage device (e.g., a hard drive) can be hidden to all of the platform but a chipset agent. In one embodiment, a VE can virtualize a storage device such that a portion of the storage device is held in reserve for use by the chipset. As one example, a hidden range can be made visible only to the VE and ME via a virtualization logic in the chipset. This hidden partition may be used to store BIOS extensions/drivers that can be accessed by a BIOS module such as a PBA loader. This loader may be used to access the hidden partition through a dedicated block storage interface based on DHCI (which is an authenticated interface into the ME).

Figure 6:
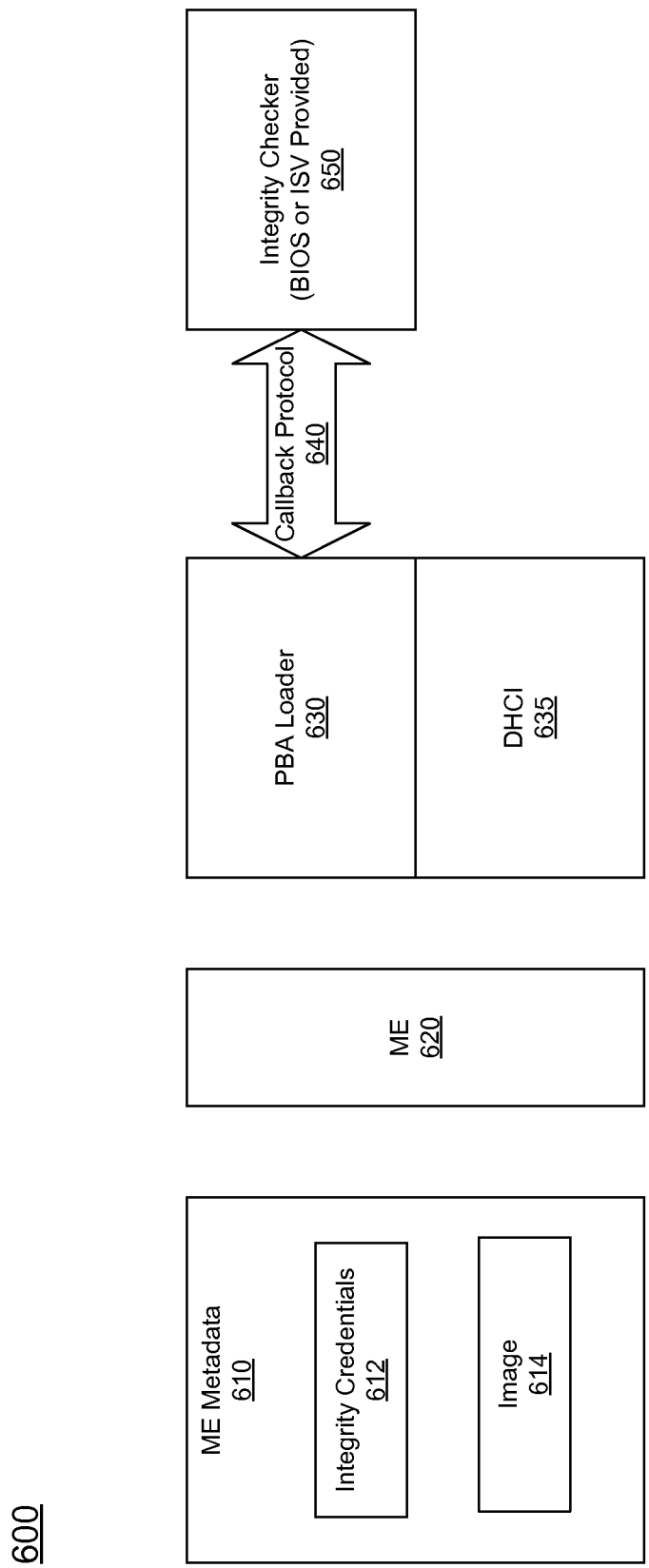
FIG. 6 is a block diagram of the interaction between data stored in a hidden partition, an interface to the hidden partition, and an integrity checker in accordance with an embodiment of the present invention.

Referring now to FIG. 6, shown is a block diagram of the interaction between data stored in a hidden partition, an interface to the hidden partition, and an integrity checker in accordance with an embodiment of the present invention. As seen in FIG. 6, system 600 includes a data storage 610 which one embodiment may be part of a non-volatile storage or mass memory such as a SATA drive. Portion 610 may correspond to at least a part of a hidden partition that is inaccessible to a remainder of a system other than a chipset or part of the chipset, e.g., a ME. As seen, in one embodiment metadata 610 may include image integrity data corresponding to an integrity credential 612 and an image 614, which may be a BIOS extension image. Access to this information in the hidden partition may be via a ME 620. In turn, various modules can communicate with ME 620, including a PBA loader 630, in the form of an encryption services-PBA loader, and a DHCI 635, in the form of an encryption services-DHCI. In turn, via a callback protocol 640, an integrity check may be performed by an integrity checker 650, which may be provided by the ISV or may be part of a BIOS. While shown with this particular implementation in the embodiment of FIG. 6, understand the scope of the present invention is not limited in this regard.

Figure 7:
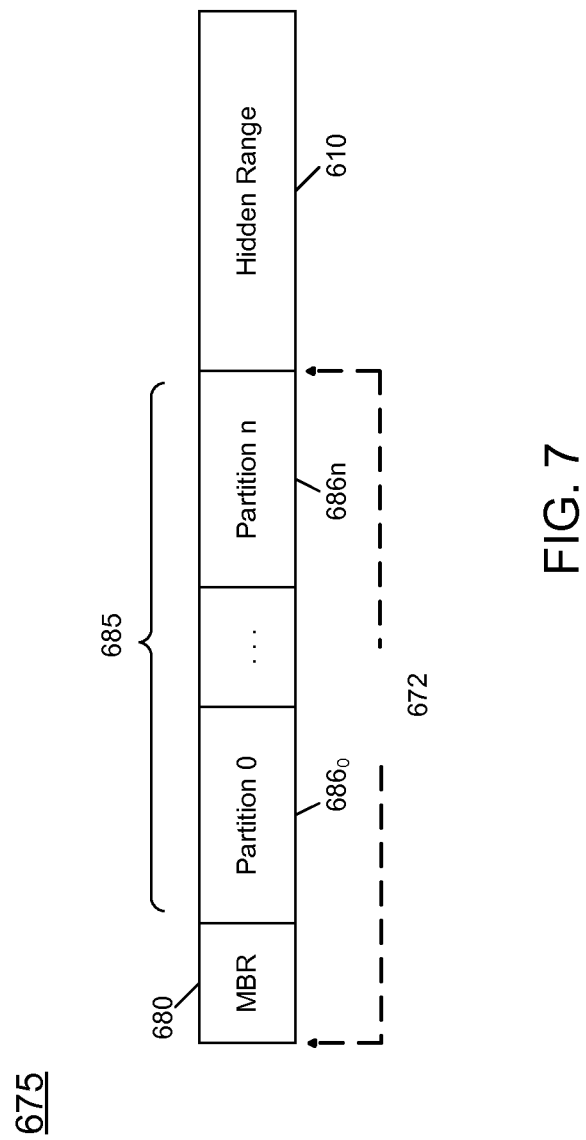
FIG. 7 is a block diagram of a storage device in accordance with an embodiment of the present invention.

For further details of a hidden partition, reference can be made to FIG. 7, which is a block diagram of a storage device in accordance with an embodiment of the present invention. As seen in FIG. 7, storage 675, which may correspond to a SATA storage device, includes a host visible region 672 and a hidden region 610. As seen, the host visible region includes a master boot record (MBR) 680 and a plurality of partitions 685 including partitions $686_0$-$686_n$, where partition $686n$ may correspond to a logical end of the host visible region of the storage device. However, hidden partition 610 may be accessible, e.g., to a ME of the chipset and may be used to store various secure information, such as integrity credentials and one or more images such as BIOS extensions.

In various embodiments, the image and integrity credential are copied into host memory from the hidden partition. Before the image is scheduled for execution by the BIOS driver scheduler, it may be integrity checked by a BIOS or ISV-provided integrity checker. In one embodiment, the integrity checker uses BIOS native policies for describing integrity such as a whitelist, digital certificate or trusted anchor key. Once the integrity check is complete, DHCI services may be used to schedule the driver for execution.

Figure 8:
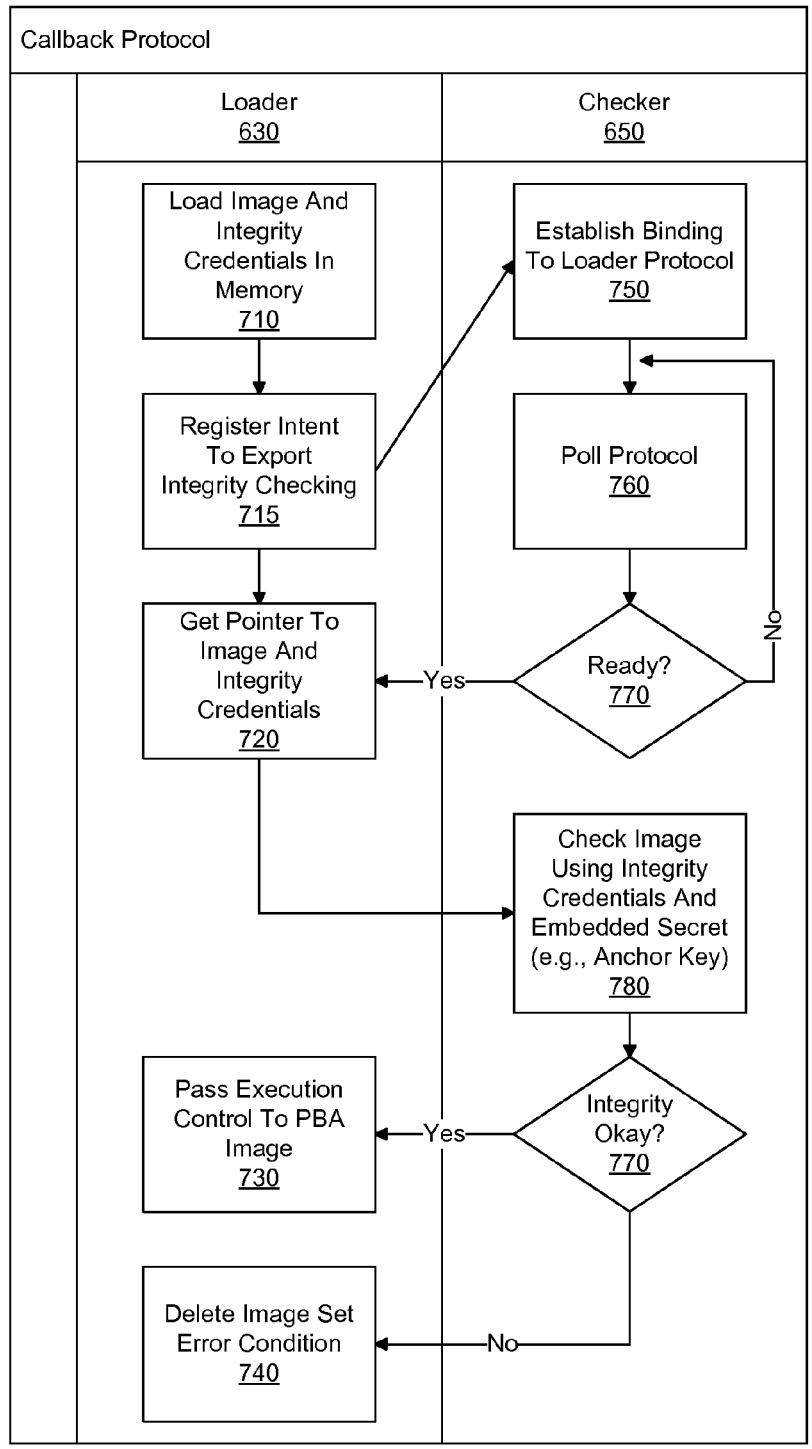
FIG. 8 is a flow diagram of an integrity method in accordance with one embodiment of the present invention.

FIG. 8 is a flow diagram of a method for performing loading and integrity checking on an image present in a hidden partition in accordance with an embodiment of the present invention. As shown in FIG. 8, method 700 may be used to ensure, via a loader and integrity checker, that only authorized modules are loaded. Method 700 may perform a callback protocol as implemented using both loader 630 and checker 650. Discussion begins first with the operations performed by loader 630. As seen, at block 710, the loader may load the image and integrity credentials into memory. In one embodiment, the loader may load such information into system memory, e.g., a dynamic random access memory. Control then passes to block 715, where a registration process may be performed. More specifically, the loader may register its intent to export integrity checking to checker 650. Before describing the operations performed by checker 650, additional operations performed by loader 630 are discussed.

As further seen in FIG. 8, after this registration process, the loader may obtain a pointer to the image and integrity credentials (block 720). On receiving control back from checker 650, loader 630 may pass execution control to the PBA image, namely the loaded image, assuming that integrity has been established (block 730). If instead, it is determined by the checker that integrity has not been established, control passes to block 740, where the image may be deleted and an error condition may be set. Accordingly, at this point control may pass to a selected path, e.g., one of multiple exception handling paths. In a first path, an exception handler logs the existence of improper PBA code using a trusted platform module (TPM) platform configuration register (PCR). Then the boot continues normally (e.g., flows to block 730) or the boot is halted, and control flows to a manageability controller such as AMT for out-of-band remediation. Or further boot continues but without exposed access to certain resources such as the hard drive image. Instead, a safe mode OS could be loaded from an unencrypted partition where the platform can be connected to a remediation network. In yet other embodiments, control can pass to some entity responsible for handling catastrophic situations as the PBA image is not trusted and user authentication and system/boot cannot be performed.

FIG. 8 also shows the operations performed by checker 650 in the integrity verification process. As seen in FIG. 8, checker 650 may receive a registration message from loader 650 to initiate the callback protocol with regard to operations in the checker. Specifically, checker 650 may establish a binding to the loader protocol (block 750) and then poll the loader at block 760 to determine whether the image is ready for checking, as determined at diamond 770. Note that the image may not be ready if an update process is occurring. That is, it is possible for a local agent or a remote third party to be updating a PBA such that the polling indicates that the image is not yet ready for integrity checking.

If the image is ready for checking, control passes to block 780 (after the pointer is obtained from loader 630). More specifically, the image can be checked using integrity credentials and an embedded secret (e.g., an anchor key). Accordingly, the checker may determine whether the integrity is verified. If so, control passes to block 730, discussed above where the loader may pass control to the PBA image. Otherwise, control passes to block 740 discussed above, where the image may be deleted and an error condition identified. Thus using method 700, the combination of the loader and checker may ensure that only authorized modules are loaded and able to execute. While shown with this particular implementation in the embodiment of FIG. 8, understand the scope of the present invention is not limited in this regard.

In one embodiment, ISV updates to drivers may be facilitated using the hidden partition interface during OS-present operation. As an example, a driver update utility may use the DHCI interface to provision a new version of the driver image and integrity credential. The DHCI interface may require an administrative privilege which prevents arbitrary clobbering of the image while in the hidden range.

Figure 9:
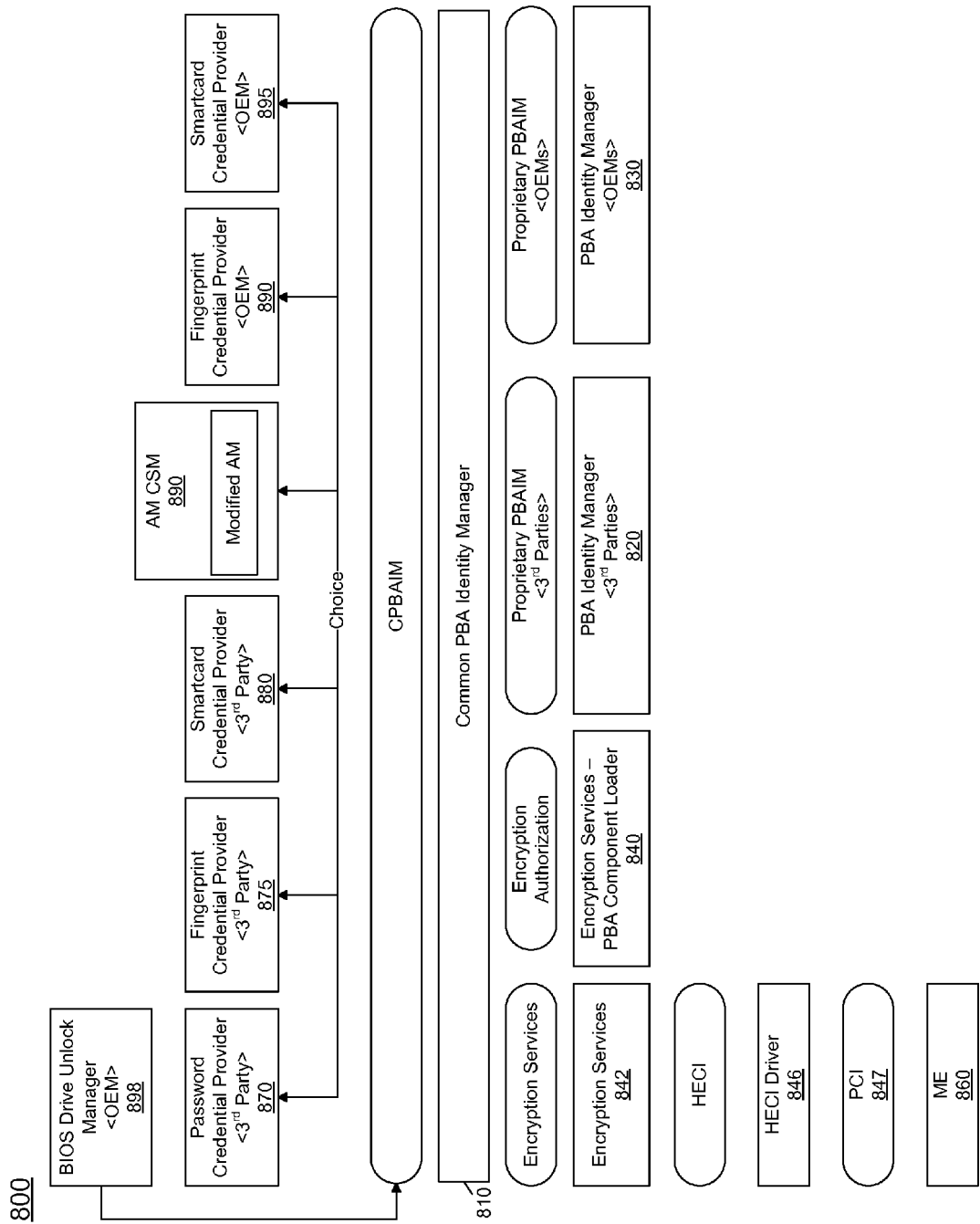
FIG. 9 is a block diagram of a pre-boot authentication driver hierarchy in accordance with an embodiment of the present invention.

Referring now to FIG. 9, shown is a block diagram of a pre-boot authentication driver hierarchy in accordance with an embodiment of the present invention. As shown in FIG. 9 pre-boot authentication drivers (e.g., credential providers and identity managers) may be dynamically constructed in BIOS. In various embodiments, the PBA modules may be provided using the hidden partition when the host visible storage is encrypted. The PBA modules can be used to authenticate users who in turn supply credentials that are used to obtain disk encryption keys that can be used by the chipset to decrypt the host visible partitions of the drive. Note that in FIG. 9, the rectangles represent services/drivers while the ovals represent protocols. Thus both the services/drivers and protocols are shown with a single reference numeral.

As seen in FIG. 9, hierarchy 800 may include a common pre-boot authentication identity manager (PBAIM) 810 that may be used to interface between proprietary pre-boot authentication protocols of various third parties and various credential mechanisms available on a system. Thus as seen in FIG. 9, common PBA identity manager 810, which may be implemented via a service/driver and an EFI protocol, e.g., as part of a BIOS image, may receive calls from these different third parties. In general, common PBA identity manager 810 may allow various third parties including ISVs and OEMs, in addition to component manufacturers to provide a path to a plug-in credential provider. More specifically, PBA identity manager 810 may select one of multiple credential providers based on unlock requirements associated with the given party. In this way, this manager bridges a gap to existing third party and proprietary PBA identity modules to ensure that unlock semantics can be coordinated.

In the embodiment of FIG. 9, such third parties may provide their own PBA identity managers. Specifically as seen in FIG. 9, the hierarchy may include third party identity managers 820 and 830, e.g., of an ISV and an OEM, respectively. In addition, other authorization modules can provide an interface between common PBA identity manager 810 and underlying hardware, including a path to a storage device such as a full disk encryption hard drive which may include a hidden partition in accordance with an embodiment of the present invention. Specifically as seen, various services, including a PBA component loader 840 which is used to implement the loader portion of the callback protocol discussed above, may communicate with the underlying platform hardware, to provide a route to an ME 860 (which in turn may be coupled to the storage device). As seen, this path may include encryption services 842, which communicate via a HECI driver 846, e.g., and via a PCI protocol 847 to ME 860.

As further seen, common PBA identity manager 810 may select one of multiple credential mechanisms available in a platform. While the scope of the present invention is not limited in this regard, such credential mechanisms may include a password credential provider 870, a fingerprint credential provider 875, and a smart card credential provider 880, all of which may be of one or more third parties. Other similar credential providers may be associated with an OEM, including, for example, in the embodiment of FIG. 9 a fingerprint credential provider 890 and a smart card credential provider 895. As further seen, another credential provider may include a authentication module 890 associated with a component manufacturer. When a user has provided the appropriate credentials via a selected credential provider (as indicated by the active third party or other PBA identity manager), the user authentication process is completed, and accordingly a BIOS drive unlock manager 898 may be executed to thus provide access to platform hardware. While shown with this particular implementation the embodiment of FIG. 9, understand the scope of the present invention is not limited in this regard.

Figure 10:
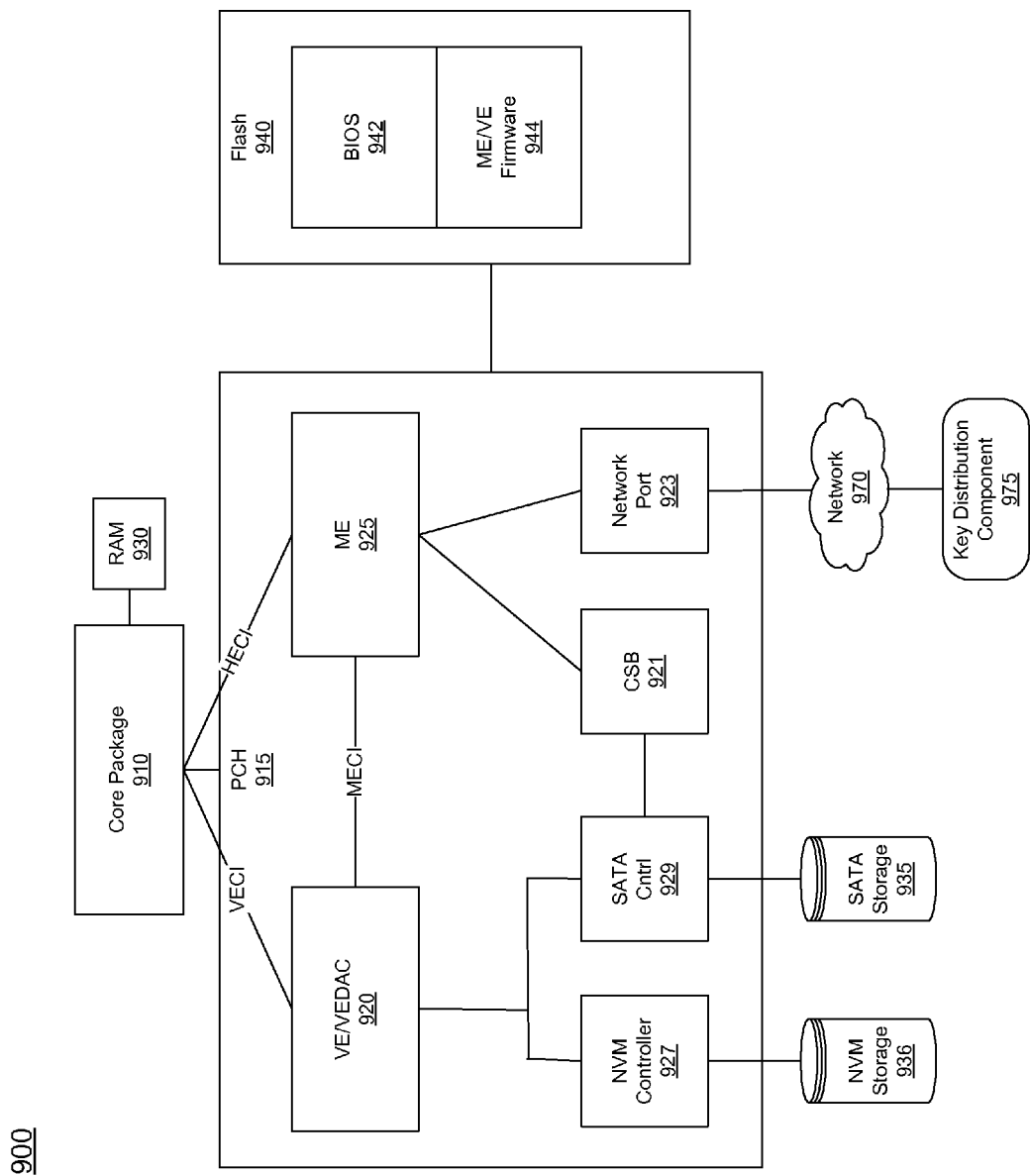
FIG. 10 is a block diagram of a system in accordance with another embodiment of the present invention.

Referring now to FIG. 10, shown is a block diagram of a system in accordance with another embodiment of the present invention. More specifically, system 900 of FIG. 10 may provide a mass storage that has a hidden partition that can be accessible to one or more chipset components. As seen, system 900 may include a core package 910 that includes at least one core and is coupled through an integrated memory controller to a system memory 930, which in one embodiment may be a DRAM. Core package 910 is further coupled to a platform controller hub (PCH) 915, which in turn may be coupled to a hard disk drive such as drive 535, which may include a hidden partition in accordance with an embodiment of the present invention.

As seen, PCH 915 may include a VE 920 and a ME 925. In the embodiment of FIG. 10, VE 920 may be coupled to core package 910 via a VECI and in turn ME 925 may be coupled to core package 910 via a HECI. The two engines may in turn be coupled via a manageability engine controller interface (MECI). For communications with peripheral storage device 935 and a non-volatile memory storage 936, VE 920 may in turn be coupled to a NVM controller 927 and a SATA controller 929 which as seen is further coupled to a cryptographic service block (CSB) 921. In addition, another non-volatile storage, namely a flash memory 940 may be coupled to PCH 915 and may include, in one embodiment a BIOS image 942 and ME/VE firmware 944. While not shown in the illustration of FIG. 10, one or both of the ME and the VE may include a microcontroller, a cache memory, a read-only memory (ROM) and so forth. In turn, ME 925, via network port 923, may be coupled to a network port 970 which in turn couples to a remote entity 975, which may act as a key distribution component. Thus a remote agent may couple to system 900 remotely through network 970. In this way, the remote agent, which may be IT personnel or other such remote user, such as a third-party ISV may provision the system with updated drivers or other images remotely for storage within a hidden partition.

Thus embodiments may, via a chipset, expose the hidden partition to the BIOS using an AHCI interface such that both the hidden and non-hidden partitions can be accessed at the same time. An EFI driver loader may be invoked from the BDS can fetch EFI drivers from the hidden partition, which remains hidden after boot. However, an application may use an authenticated interface (DHCI) to access the hidden area to perform local update and provisioning. Accordingly, the hidden partition can be updated remotely using the chipset ME via an out-of-band (OOB) interface without the use of a host SATA driver.

As a result, platforms in accordance with an embodiment of the present invention can be extended by ISV products to provide highly differentiated features and capabilities directly in BIOS. Furthermore, such updates can occur at a customer site without OEM involvement.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
obtaining a pre-boot authentication (PBA) image and integrity credentials associated with the PBA image from a hidden partition of a non-volatile storage of a system in a pre-boot environment, wherein the non-volatile storage is configured with full disk encryption (FDE) and the hidden partition accessible only to an engine of a chipset, and storing the PBA image in a system memory;
performing a callback protocol by a combination of a loader executing on the engine of the chipset and an integrity checker of a third party that provided the PBA image to confirm integrity of the PBA image; and
executing the PBA image if the integrity is confirmed, and otherwise deleting the PBA image from the system memory.

2. The method of claim 1, further comprising receiving an updated PBA image from a location remote to the system via the third party.

3. The method of claim 2, further comprising storing the updated PBA image in the hidden partition of the non-volatile storage.

4. The method of claim 3, further comprising storing the updated PBA image in the hidden partition via an out-of-band interface and without access to a host driver for the non-volatile storage.

5. The method of claim 4, further comprising storing the updated PBA image in the hidden partition during operating system (OS) control of the system using a host controller interface (HCI) having an administrative privilege.

6. The method of claim 1, wherein performing the callback protocol includes:
registering an intent to export integrity checking from the loader to the integrity checker;
obtaining a pointer to the PBA image and the integrity credentials associated with the PBA image; and
providing the pointer to the integrity checker.

7. The method of claim 6, wherein performing the callback protocol further includes:
establishing a binding between the integrity checker and the loader responsive to the registering; and
checking the PBA image using the integrity credentials and an embedded secret accessible to the integrity checker.

8. The method of claim 6, further comprising updating the integrity credentials in the non-volatile storage from a location remote to the system via the third party.

9. The method of claim 1, wherein the integrity checker communicates with a common PBA identity manager that selects one of a plurality of authentication devices of the system for performing an authentication procedure for a user of the system, the selection based on an unlock protocol of the third party.

10. An article comprising a non-transitory machine-accessible storage medium including instructions that when executed cause a system to
- obtain a pre-boot authentication (PBA) image and integrity credentials associated with the PBA image from a hidden partition of a storage device coupled to a chipset of the system in a pre-boot environment, wherein the storage device is configured with full disk encryption (FDE) and the hidden partition accessible only to an engine of the chipset, and store the PBA image in a memory of the system;
- perform a callback protocol by a combination of a loader executing on the engine of the chipset and an integrity checker of a third party that provided the PBA image to confirm integrity of the PBA image; and
- execute the PBA image if the integrity is confirmed, and otherwise delete the PBA image from the memory.

11. The article of claim 10, further comprising instructions that when executed cause the system to store an updated PBA image in the hidden partition of the storage device, via an out-of-band interface and without access to a host driver for the storage device.

12. The article of claim 10, further comprising instructions that when executed enable the system to:
- register an intent to export integrity checking from the loader to the integrity checker;
- obtain a pointer to the PBA image and the integrity credentials associated with the PBA image; and
- provide the pointer to the integrity checker.

13. The article of claim 12, further comprising instructions that when executed enable the system to:
- establish a binding between the integrity checker and the loader responsive to the registration; and
- check the PBA image using the integrity credentials and an embedded secret accessible to the integrity checker.

14. The article of claim 10, further comprising instructions that when executed enable the system to communicate with a common PBA identity manager that selects one of a plurality of authentication devices of the system for performing an authentication procedure for a user of the system, the selection based on an unlock protocol of the third party.

15. A system comprising:
- a processor;
- a chipset coupled to the processor and including a first engine to execute a pre-boot loader; and
- a mass storage coupled to the chipset, the mass storage configured for full disk encryption, wherein the mass storage has an encrypted region and a hidden region to store a pre-boot authentication (PBA) image of a third party and integrity credentials associated with the PBA image, wherein the hidden partition is accessible only to the first engine and the first engine is to access, via a loader, the hidden region in a pre-boot environment and to load the PBA image to a memory and to execute a callback protocol by a combination of the loader and an integrity checker of the third party.

16. The system of claim 15, wherein the first engine is to store an updated PBA image in the hidden region via an out-of-band interface and without access to a host driver for the mass storage.

17. The system of claim 15, wherein the first engine is to register an intent to export integrity checking from the loader to the integrity checker, obtain a pointer to the PBA image and the integrity credentials associated with the PBA image, and provide the pointer to the integrity checker.

18. The system of claim 17, wherein the first engine is to establish a binding between the integrity checker and the loader responsive to the registering, and check the PBA image using the integrity credentials and an embedded secret accessible to the integrity checker.

19. The system of claim 15, wherein the first engine is to communicate with a common PBA identity manager that selects one of a plurality of authentication devices of the system for performing an authentication procedure for a user of the system, the selection based on an unlock protocol of the third party.

\* \* \* \* \*